United States Patent
Palanisamy et al.

(10) Patent No.: US 10,732,639 B2
(45) Date of Patent: Aug. 4, 2020

(54) METHOD AND APPARATUS FOR AUTOMATICALLY GENERATED CURRICULUM SEQUENCE BASED REINFORCEMENT LEARNING FOR AUTONOMOUS VEHICLES

(71) Applicants: GM GLOBAL TECHNOLOGY OPERATIONS LLC, Detroit, MI (US); Carnegie Mellon University, Pittsburgh, PA (US)

(72) Inventors: Praveen Palanisamy, Sterling Heights, MI (US); Zhiqian Qiao, Pittsburgh, PA (US); Upali P. Mudalige, Oakland Township, MI (US); Katharina Muelling, Pittsburgh, PA (US); John M. Dolan, Pittsburgh, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 15/915,419

(22) Filed: Mar. 8, 2018

(65) Prior Publication Data

US 2019/0278282 A1 Sep. 12, 2019

(51) Int. Cl.
*G05D 1/02* (2020.01)
*G06N 3/08* (2006.01)
*G05D 1/00* (2006.01)

(52) U.S. Cl.
CPC ......... *G05D 1/0221* (2013.01); *G05D 1/0088* (2013.01); *G06N 3/08* (2013.01)

(58) Field of Classification Search
CPC ....... G05D 1/0221; G05D 1/0088; G06N 3/08
USPC .......................................................... 701/27
See application file for complete search history.

(56) References Cited

U.S. PATENT DOCUMENTS

| | | | |
|---|---|---|---|
| 10,133,275 B1 * | 11/2018 | Kobilarov | G05D 1/0088 |
| 10,380,482 B2 * | 8/2019 | Sutskever | G06N 3/08 |
| 2009/0327011 A1 * | 12/2009 | Petroff | G06Q 10/02 705/5 |
| 2019/0101917 A1 * | 4/2019 | Yao | B60W 30/0956 |
| 2019/0102668 A1 * | 4/2019 | Yao | G05B 17/02 |
| 2019/0113929 A1 * | 4/2019 | Mukadam | G08G 1/167 |
| 2019/0310654 A1 * | 10/2019 | Halder | G05D 1/0088 |
| 2019/0369637 A1 * | 12/2019 | Shalev-Shwartz | G05D 1/0214 |

* cited by examiner

*Primary Examiner* — Krishnan Ramesh
(74) *Attorney, Agent, or Firm* — Lorenz & Kopf, LLP

(57) ABSTRACT

The present application generally relates to a method and apparatus for generating an action policy for controlling an autonomous vehicle. In particular, the system performs a deep learning algorithm in order to determine the action policy and an automatically generated curriculum system to determine a number of increasingly difficult tasks in order to refine the action policy.

16 Claims, 4 Drawing Sheets

METHOD AND APPARATUS FOR AUTOMATICALLY GENERATED CURRICULUM SEQUENCE BASED REINFORCEMENT LEARNING FOR AUTONOMOUS VEHICLES

BACKGROUND

The present disclosure relates generally to programming autonomous motor vehicle control systems. More specifically, aspects of this disclosure relate to systems, methods and devices for behavior planning using automatically generating curriculum sequence based reinforcement learning for autonomous vehicles in a complicated environment.

BACKGROUND INFORMATION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Appropriate situation awareness is essential for autonomous driving due to safety concerns. Even though it is desirable to put all available information into autonomous driving decision process; however, for practical implementation, input data to the system should be limited and manageable; therefore it needs to be well-designed for both efficiency and sufficiency for decision making. An autonomous vehicle generally must generate a data structure to perceive situations around the vehicle. Through sensors mounted on the autonomous driving vehicle, a huge amount of information is delivered to the system; therefore, efficient analysis of all perception data for safe driving is crucial.

Dense urban environments, with their corresponding large amounts of information are particularly difficult for both autonomous vehicles and human drivers. For example, how to approach and then traverse an urban intersection is a difficult problem and is a situation where most traffic accidents take place. The main reason for this high rate of accidents lies in the abundance of external factors the driver needs to pay attention to. While approaching a stop-sign, the driver needs to pay attention to the vehicle in front of it in order to avoid being too close or too far from it. At the same time, a driver needs to stop at the stop line accurately so that it will not block the intersection or crash into other vehicles approaching from other directions. Subsequently, the driver needs to make the proper decision on when to initiate the traverse the intersection. New drivers may have difficulty knowing when to traverse and even some experienced drivers may miss important traffic information. Autonomous driving behavior at intersections therefore is potentially very beneficial. However, in order to design a reliable planning algorithm allowing a self-driving vehicle to make safe decisions, engineers need to be insightful enough to foresee every possible bad situation. Unpredictable environment changes and frequent human interactions in complicated city scenarios will influence the algorithm and make it extremely hard to handle various planning tasks, such as whether it is safe to go forward, or what the proper relative distance is to the front vehicle.

Prior distance-based algorithms for the intersection traversing problem always include some tuning parameters to deal with different scenarios. Tuning these parameters is laborious, since algorithms are not easily adapted to various environmental situations. These algorithms also require the design of a large number of distance-based rules to handle different situations. It would be desirable to perceive situations around an autonomous vehicle with reduced complexity in computation without loss of crucial details to make improved navigation and control decisions.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, a method of training a vehicle control system comprising determining a final task, receiving an input from a first vehicle sensor, determining a first task and a second task in response to the final task and the input wherein the second task has a higher difficulty that the first task, training an agent to perform the first task in order to generate an action policy to maximize a first reward, and to perform the second task in response to the action policy to maximize a second reward and controlling a vehicle in performance of the second task in response to the action policy.

In accordance with another aspect of the present invention an apparatus for an apparatus comprising a sensor for detecting an input, a processor for determining a final task, the processor being further operative to determine a first task and a second task in response to the final task and the input wherein the second task has a higher difficulty that the first task, performing the first task in order to generate an action policy to maximize a first reward, and to perform the second task in response to the action policy to maximize a second reward, and generating a control signal in response to the action policy, and controlling a vehicle in response to the control signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
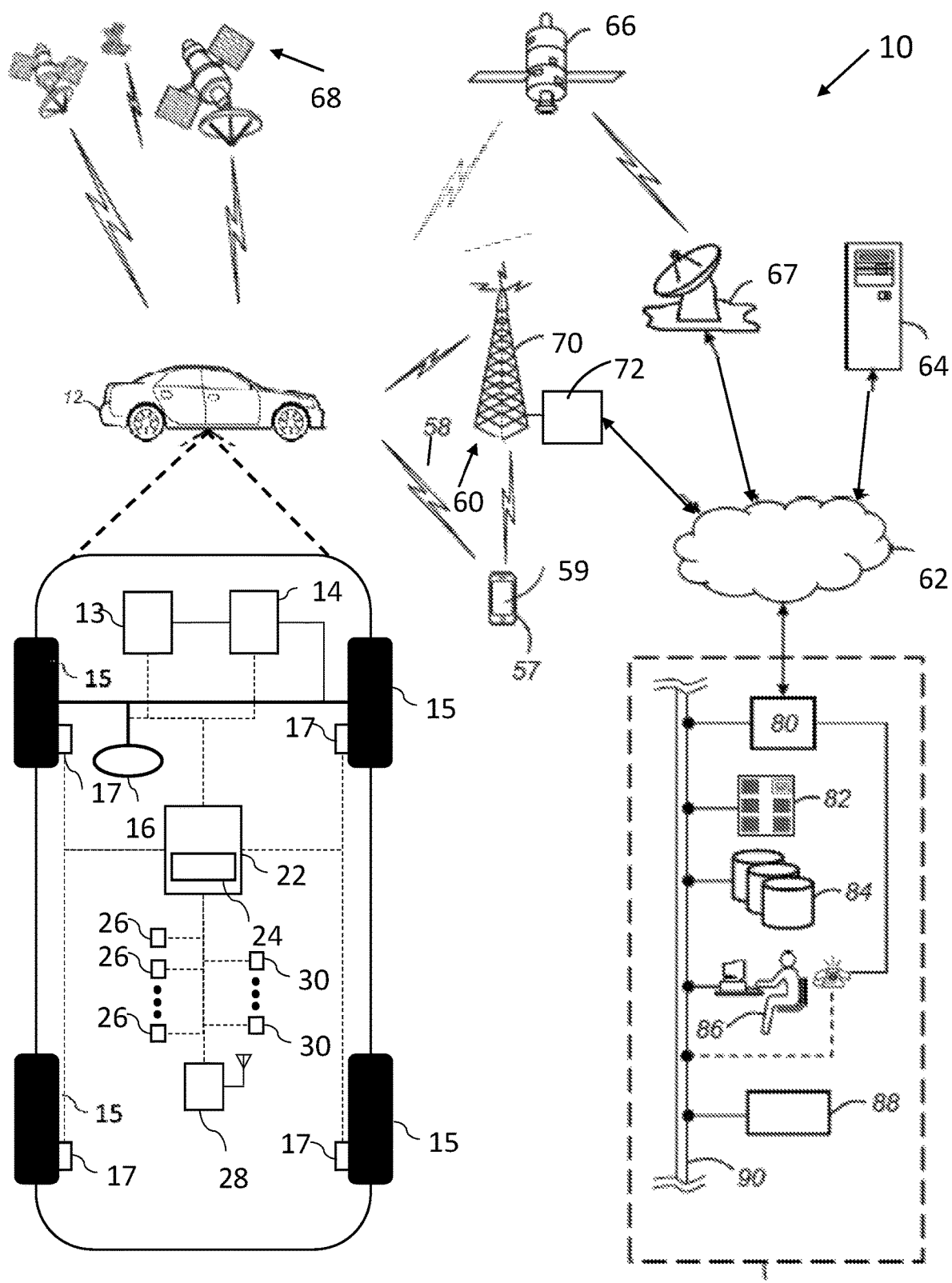
FIG. 1 shows an operating environment that comprises a mobile vehicle communication and control system for a motor vehicle according to an exemplary embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
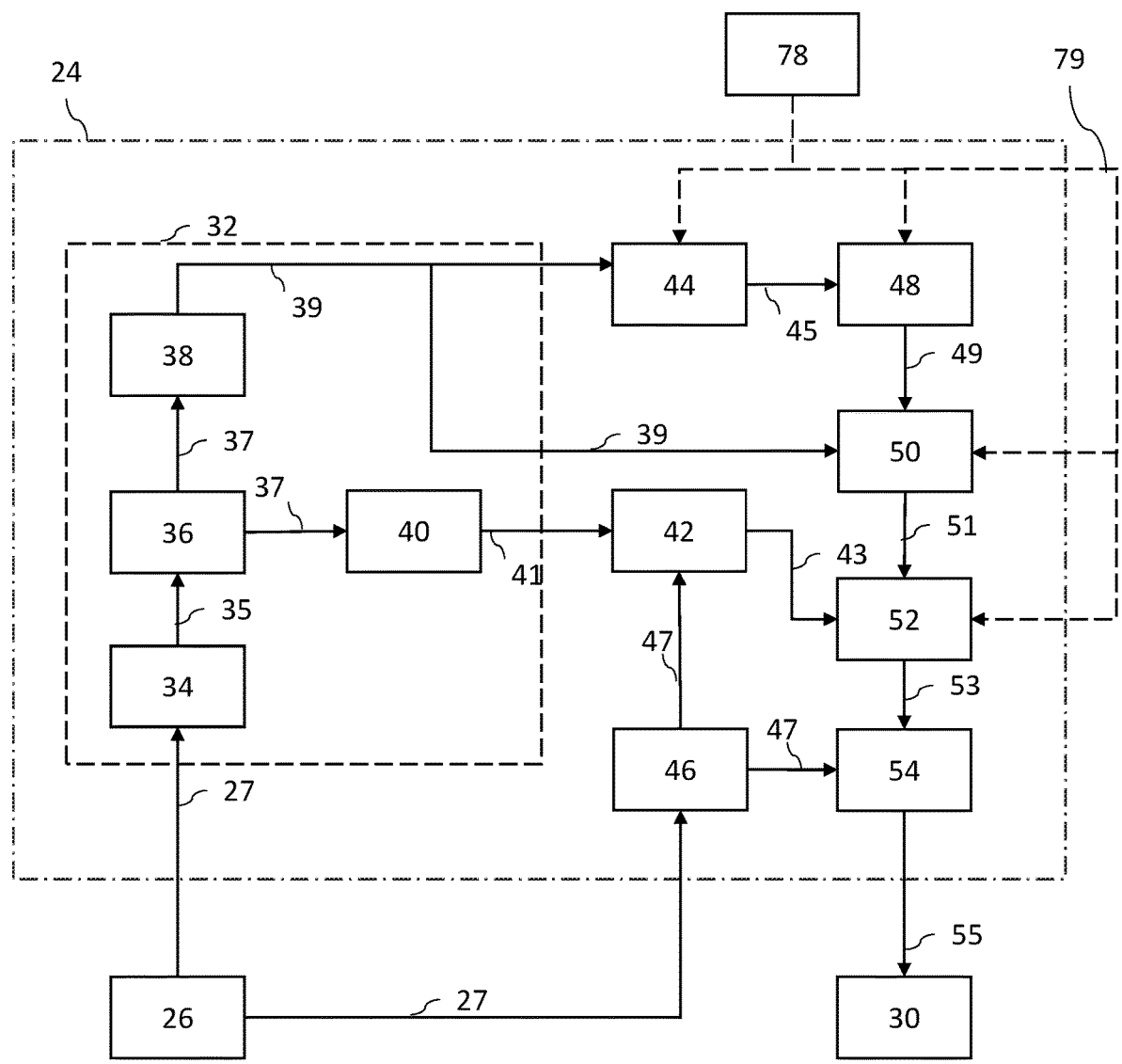
FIG. 2 shows the ADS including multiple distinct control systems for determining the presence, location, classification, and path of detected features or objects in the vicinity of the vehicle according to an exemplary embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1},A_t,D_t) \qquad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1},D_t) \qquad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1}, A_t, D_t) \qquad \text{Equation 3}$$

where the probability of a hypothesis $H_t$ is based on the previous hypothesis $H_{t-1}$, an action $A_t$, and data $D_t$ at current time t.

Used extensively in robotics, a Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X'_t = AX_{t-1} + B\mu + \varepsilon_t \qquad \text{Equation 4}$$

where $X'_t$ is a new state based on the previous state $AX_{t-1}$, $B\mu$ and $\varepsilon_t$. Constants A and B are defined by the physics of interest, $\mu$ is typically a robotic motor command, and $\xi_t$ is a Gaussian state error prediction.

Sensor prediction is expressed as:

$$Z'_t = CX_t + \xi_z \qquad \text{Equation 5}$$

where $Z'_t$ is the new sensor estimate, C is a function and $\xi_z$ is a Gaussian sensor error prediction.

A new predicted state estimate is expressed as:

$$X_{EST} = X'_t + K(Z_t - Z'_t) \qquad \text{Equation 6}$$

where the product $K(Z_t - Z'_t)$ is referred to as the Kalman gain factor. If the difference between the sensor prediction $Z'_t$ and the actual sensor data $Z_t$ (that is, $Z_t - Z'_t$) is reasonably close to zero, then $X'_t$ is considered to be the new state estimate. If $Z_t - Z'_t$ is reasonably larger than zero, the $K(Z_t - Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)\,P(D|H)}{P(D)} \qquad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
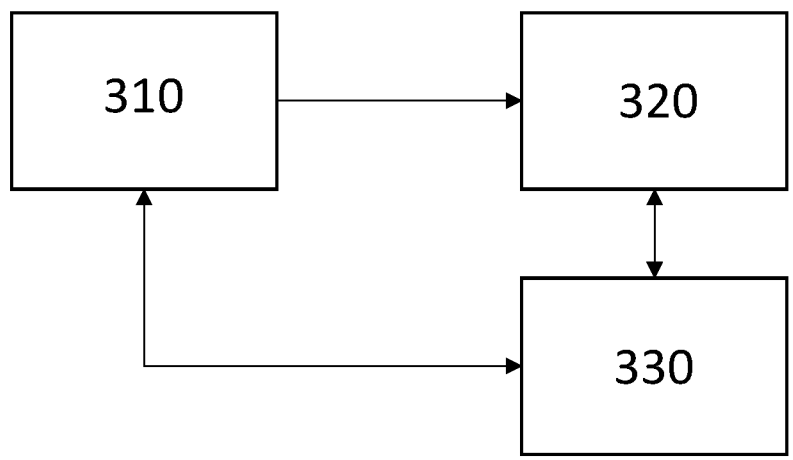
FIG. 3 shows an exemplary block diagram illustrating an exemplary implementation of a system for an automatically generated curriculum sequence based reinforcement learning for autonomous vehicles according to another exemplary embodiment.

Turning now to FIG. 3, an exemplary block diagram illustrating an exemplary implementation of a system for an automatically generated curriculum sequence based reinforcement learning for autonomous vehicles 300 is shown. The system includes at least one sensor for receiving outside information, or environmental state information 330. The system further includes a processor 310 a processor for determining a task to be performed by the autonomous vehicle. The processor 310 is operative to determine a number of tasks associated with the final task and to rank these tasks in order of difficulty. The processor performs the tasks in order of complexity according to a curriculum sequence wherein the results of a performed task are used to determine the critique of the subsequent tasks. The processor 310 is then operative to generate an action policy to control a vehicle control system and to generate a control signal in response to the action policy. The system further includes a controller 320 for controlling the vehicle in response to the control signal and the environmental state information.

The system is operative to use reinforcement learning (RL) to generate a control algorithm for autonomous vehicle control by applying deep reinforcement learning (DRL) methods to train a control algorithm that can autonomously learn how to approach and traverse an urban stop-sign intersection by collecting information on surrounding vehicles and the road. Unlike rule-based algorithms, RL algorithms can learn to deal with unpredictable and changeable situations based on errors and trials during the training process. Unlike supervised learning, RL does not need a large amount of labeled data to training a data-based model. The algorithm enables developing a flexible mapping function from environment states to agent actions according to recorded experience, which is similar to how human drivers learn to drive.

Previously, DRL methods encounter difficulty with high-dimensional state space problems such as autonomous vehicle decision-making in complicated urban environments. To overcome this problem, previous DRL algorithms required a long training period to get an acceptable result. For difficult problems with high-dimensional state spaces, these algorithms could not guarantee convergence of the loss function and satisfactory performance during a limited training period.

Figure 4:
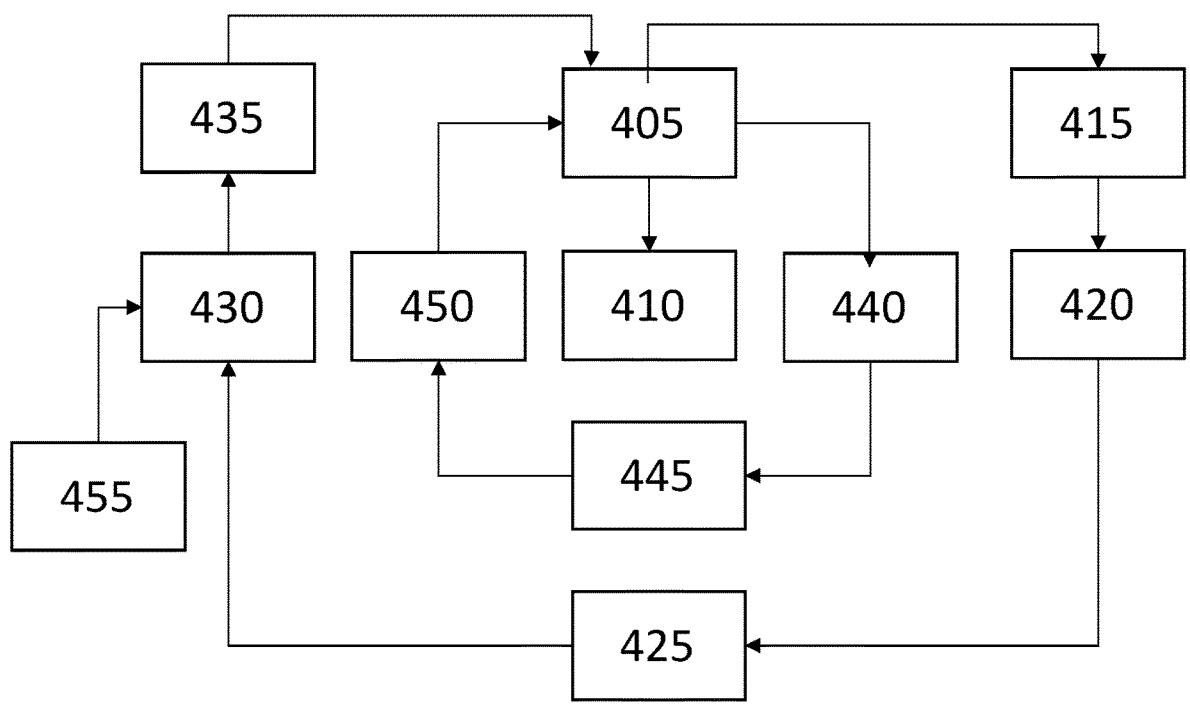
FIG. 4 shows an exemplary flow chart illustrating an exemplary implementation of a method for an automatically generated curriculum sequence based reinforcement learning for autonomous vehicles.

The current system addresses these problems by implementing a Curriculum Learning (CL) system, wherein the system does not directly learn a task by solving complex instances of the problem, but starts from simpler cases and gradually increase the difficulty. CL is used to decrease the complexity of difficult problems by starting from easy cases instead of random initializations. The system is operative to apply CL to the DRL algorithm in order to simplify and accelerate the process of training by using an Automatically Generated Curriculum Sequence (AGCS) based Reinforcement Learning method, whose flow chart is shown in FIG. 4.

AGCS-based reinforcement learning is a hierarchical reinforcement learning method in which the higher-level reinforcement learning structure is responsible for automatically generating curriculum sequences according to total rewards from the current training iteration of each task with its own difficulty. Meanwhile, in the lower-level RL structure, a traditional DRL algorithm such as DQN or DDPG can be applied to train a policy which can perform discrete or continuous actions for different scenarios. FIG. 4 shows the flow chart for an exemplary DR1 algorithm according to an AGCS-based DQN. The inner loop comprising of the blocks 405, 440, 445, 450 and 410 is the DQN process and the outer loop is the process for generating the curriculum sequences. In the outer part, the policy of curriculum generation is formulated as a k-armed bandit problem, where k is chosen based on the number of tasks using an action-value based incremental method for the AGCS-based method. The exemplary framework allows other methods to be incorporated easily. The Q function of curriculum generation is updated where $i \in [1,N]$ is the task id and k is one specific training iteration.

$$Q_{ki+1} = \alpha r_i + (1-\alpha) Q_{ki} \tag{1}$$

The value of $Q^i$ can be used to evaluate the difficulty of each task that higher values indicates higher difficulty levels, and AGCS-based RL can choose the task to be trained in the next iteration via the Boltzmann distribution exploration method.

$$\pi(c_t|h_t) = \exp(Q_{it}) / \Sigma_i N \exp(Q_{ti})$$

An easier task with a higher Qc will get a higher probability to be chosen as the curriculum for the next training iteration.

Deep reinforcement learning methods for discrete or continuous actions usually store the last M experiences with tuples of st, at, rt, st+1, at+1 in a replay buffer. However, this form of replay buffer does not identify the important transitions and always overwrites using the most recent transitions in proportion to the finite memory size of M. The traditional RL approaches use uniform sampling, which gives equal importance to all transitions in the replay memory, and may result in an unbalanced memory with more failure cases than success epochs. In an exemplary embodiment, the buffer is added to a Replay Buffer B based on the probability of a task's being chosen for the next training iteration. This means that with a higher reward and better performance will have a higher probability of being added to the replay buffer at the same time. Meanwhile, if the transition includes success for traversing or stopping, it also will be stored in the buffer with higher probability. If the transition is not chosen, it will be abandoned without storing into the buffer so that we may save more space for transitions which are more important.

Turning now to FIG. 4, a flow chart illustrating an exemplary implementation of a method for an automatically generated curriculum sequence based reinforcement learning for autonomous vehicles 400 is shown. The method consists of two work flows in order to train the autonomous vehicle behavior in complex situations. The first work flow is a deep reinforced learning algorithm wherein the vehicle control system is presented with an observation, or a state 440, at a first time. The observation may include a reward associated with the last transition. The method is then operative to evaluation an action policy 445 and then choose an action 450 from an available set of actions. The action is returned to the environment setting 405. The intrinsic reward is then transmitted to a critic network 410 in response to the performance of the action 450. The critic network is used to train the action policy 445 by updating the parameters for the neural network in response to a Temporal Difference error.

The second of the workflow is an AGCS wherein the first a mean reward 415 is determines for an observation over a number of N types of tasks, wherein the mean reward 415 is determines from a reward chain for each of the N tasks. In this exemplary embodiment, the policy of the curriculum generation process is formulated as a k-arm bandit problem where k is chosen based on the number of tasks and an action-value based incremental method is used for the AGCS. The mean reward 415 is used to drive the AGCS. The mean reward 415 is applied to a higher state 420 series of observations. A task-value similar to an action-value is calculated based on the equation $(\hat{Q}i\_\{k+1\}=\alpha \hat{r}I+(1-\alpha) \hat{Q}i\_k)$. The value of $\hat{Q}i$ can be used to evaluate the utility of each task. Curriculum policy 425 determines the next task in the curriculum sequence that can be based on a Boltzmann distribution exploration method derived from the current task-value function $\hat{Q}I$ for each of the N tasks, the higher-level state 420 and the reward 415. In this exemplary embodiment, N can be 6-8 tasks, but any number of tasks may be selected. The action value of the tasks is determined 435 and an order of tasks is generated. The tasks are performed 430 in the order prescribed by the AGCS. A sequence of tasks 435 is determined where a particular difficulty is determined for a particular task for a chosen task, chooses the action value for that particular task, determines the task, action is to choose a particular task to improve. Each task is associated with an intrinsic reward wherein the intrinsic reward is used to determine the performance of each task. The learning block 435 keeps updated information based on intrinsic work and tries to learn the function based on how much percentage of vehicle navigate the tasks successfully. A replay buffer 455 is operative to store the experience of what the agent encountered, prioritized replay buffer, more priority to transitions that have the higher reward than the transitions that did not yield a lower reward and are prioritized based on success in order to reduce access time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of training a vehicle control system comprising:
   determining a final task;
   receiving an input from a first vehicle sensor;
   determining a first task and a second task in response to the final task and the input wherein the second task has a higher difficulty that the first task and wherein the first task and the second task are determined in response to a curriculum learning system and wherein the determination of the first task and the second task are made according to an action value based incremental method for an automatically generated curriculum sequence;
   training an agent to perform the first task in order to generate an action policy to maximize a first reward, and to perform the second task in response to the action policy to maximize a second reward; and
   controlling a vehicle in performance of the second task in response to the action policy.

2. The method of claim 1 wherein the action policy is generated in accordance with a reinforced learning system.

3. The method of claim 1 wherein the curriculum learning system utilizes an armed bandit problem methodology.

4. The method of claim 1 wherein a curriculum sequence is determined in response to a first difficulty of the first task and a second difficulty of the second task and wherein the curriculum sequence is used to train an agent to generate an optimal action policy.

5. The method of claim 1 wherein a transition is the transitions are stored to a replay buffer.

6. The method of claim 1 wherein the second task is performed a plurality of times and wherein an evaluation is made based on the performance of the second task and wherein the evaluation is stored in a replay buffer.

7. The method of claim 1 wherein a critic network is used to train the action policy in response to a performance of the second task.

8. The method of claim 1 wherein a critic network is used to train the action policy by updating a parameter of a neural network in response to a temporal difference error.

9. An apparatus comprising:
   a sensor for detecting an input;
   a processor for determining a final task, the processor being further operative for determining a first task and a second task in response to the final task and the input wherein the second task has a higher difficulty that the first task wherein the first task and the second task are determined in response to a curriculum learning system and wherein the determination of the first task and the second task are made according to an action value based incremental method for an automatically generated curriculum sequence, training an agent to perform the first task in order to generate an action policy to maximize a first reward, and to perform the second task in response to the action policy to maximize a second reward; and
   controlling a vehicle in performance of the second task in response to the action policy.

10. The apparatus of claim 9 wherein the action policy is generated in accordance with a reinforced learning system.

11. The apparatus of claim 9 wherein the curriculum learning system utilizes an armed bandit problem methodology.

12. The apparatus of claim 9 wherein a curriculum sequence is determined in response to a first difficulty of the first task and a second difficulty of the second task and wherein the curriculum sequence is used by the agent to generate the action policy.

13. The apparatus of claim 9 wherein a grade of the performance of controlling the vehicle according to the final task is stored to a replay buffer.

14. The apparatus of claim 9 wherein the second task is performed a plurality of times and wherein an evaluation is made based on the performance of the final task and wherein the evaluation is stored in a replay buffer.

15. The apparatus of claim 9 wherein a critic network is used to train the action policy in response to a performance of the final task.

16. The apparatus of claim 9 wherein a critic network is used to train the action policy by updating a parameter of a neural network in response to a temporal difference error.

\* \* \* \* \*